(12) United States Patent
LaBerge

(10) Patent No.: US 6,678,803 B2
(45) Date of Patent: Jan. 13, 2004

(54) METHOD AND DEVICE TO USE MEMORY ACCESS REQUEST TAGS

(75) Inventor: Paul A. LaBerge, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/432,687

(22) Filed: Nov. 3, 1999

(65) Prior Publication Data

US 2001/0042180 A1 Nov. 15, 2001

(51) Int. Cl.[7] .................................................. G06F 12/00
(52) U.S. Cl. ......................... 711/154; 710/305; 711/105; 711/118
(58) Field of Search ................................. 711/154, 105, 711/100, 118; 365/238.5, 235; 710/305, 306

(56) References Cited

U.S. PATENT DOCUMENTS

| | | | | |
|---|---|---|---|---|
| 4,696,004 A | * | 9/1987 | Nakajima et al. ............ 714/736 |
| 4,805,098 A | * | 2/1989 | Mills et al. .................. 711/118 |
| 5,084,841 A | * | 1/1992 | Williams et al. ........ 365/189.07 |
| 5,299,199 A | * | 3/1994 | Wilson et al. ............... 370/347 |
| 5,325,487 A | * | 6/1994 | Au et al. ..................... 711/131 |
| 5,365,485 A | * | 11/1994 | Ward et al. .................. 365/221 |
| 5,630,096 A | * | 5/1997 | Zuravleff et al. ............ 365/233 |
| 5,737,520 A | * | 4/1998 | Gronlund et al. ............. 714/39 |
| 5,848,025 A | * | 12/1998 | Marietta et al. ......... 365/238.5 |
| 6,044,416 A | * | 3/2000 | Hasan ......................... 710/52 |
| 6,088,758 A | * | 7/2000 | Kaufman et al. ........... 711/100 |
| 6,173,349 B1 | * | 1/2001 | Qureshi et al. ............. 710/110 |
| 6,199,138 B1 | * | 3/2001 | Jeddeloh ..................... 711/105 |
| 6,199,145 B1 | * | 3/2001 | Ajanovic et al. ........... 711/149 |
| 6,260,091 B1 | * | 7/2001 | Jayakumar et al. ......... 710/107 |
| 6,301,627 B1 | * | 10/2001 | Neal et al. .................. 709/103 |
| 6,345,320 B1 | * | 2/2002 | Kawamata et al. ........... 710/22 |
| 6,438,659 B1 | * | 8/2002 | Bauman et al. ............. 711/141 |

* cited by examiner

Primary Examiner—Hiep T. Nguyen
(74) Attorney, Agent, or Firm—Trop, Pruner & Hu, P.C.

(57) ABSTRACT

A computer system includes a processor bus, a system bus, a memory bus and a system controller. The system controller is adapted to programmatically tag memory access requests to indicate a characteristic of the receiving interface or a characteristic of the requesting device. Characteristics of the receiving interface include internal interface state information such as current length of input and output queue structures. Characteristics of the requesting device include whether the device is a burst oriented or a non-burst oriented memory access device.

34 Claims, 3 Drawing Sheets

METHOD AND DEVICE TO USE MEMORY ACCESS REQUEST TAGS

BACKGROUND

The invention relates generally to system controller design for computer systems and, more particularly but not by way of limitation, to a device and method for tagging memory access requests with information identifying a characteristic of the system controller or requesting device.

In personal computer systems (PCs) communication between various devices coupled to different buses and access to system memory is mediated by a single bridge or system controller circuit. Many bridge circuits also facilitate the maintenance of cache coherency operations by routing requests for access to system memory to a specified bus before relaying the request to memory. To fulfill these operational roles, the electrical and functional complexity of bridge circuits has increased dramatically.

As the complexity of bridge circuit designs have increased it has become more difficult to troubleshoot (debug) the resulting devices. Often times, invasive techniques to extract signals representing the internal state of these devices must be obtained to facilitate system development and troubleshooting efforts. In addition, as the number, type and operational speed of devices seeking access to system memory increases conventional bridge circuits may fail to provide the necessary memory access bandwidth required.

Accordingly, it would be beneficial to provide a mechanism to aid system designers during the debug phase of bridge circuit development. It would also be beneficial to provide a mechanism to aid and improve the processing of memory access requests.

SUMMARY

In one embodiment the invention provides a method to process memory access request signals. The method includes receiving a memory access request signal from a device, tagging the memory access request signal to indicate a characteristic associated with the memory access request signal, and presenting the tagged memory access request signal to a bus. Illustrative characteristics include, but are not limited to, information indicative of a state of the system controller (e.g., memory request queue length) and the identity of the device issuing the memory access request signal (e.g., as a burst or non-burst oriented device). The method may also include using the information encoded in the tag to augment or modify memory access operations of a memory control unit. In another embodiment, the invention provides a system controller apparatus to implement the method.

DETAILED DESCRIPTION

Techniques (including methods and devices) to provide improved memory access control mechanisms are described.

The following embodiments of the invention, described in terms of a personal computer system having a PENTIUM® Pro processor bus, are illustrative only and are not to be considered limiting in any respect.

Figure 1:
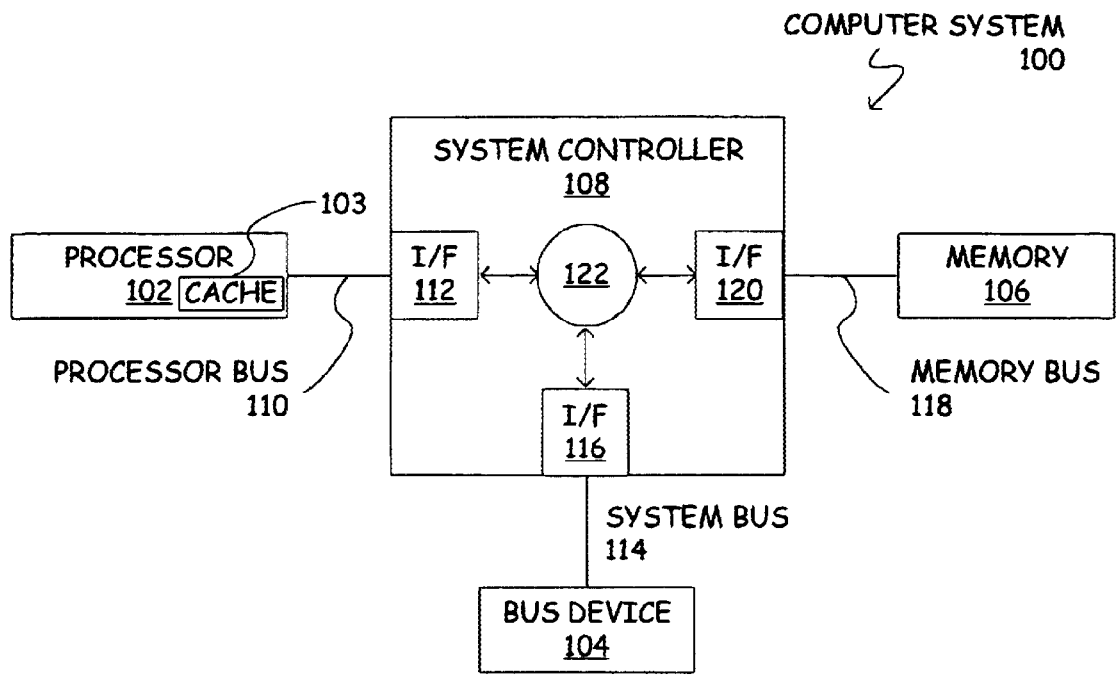
FIG. 1 shows a block diagram of a computer system in accordance with one embodiment of the invention.

Referring to FIG. 1, computer system 100 designed to utilize processor bus protocol signals to augment memory access operations is shown. Illustrative computer system 100 includes one or more host processors (only one is shown for convenience 102), one or more bus devices (only one is shown for convenience 104), system memory 106 and system controller or host bridge circuit 108. Processor 102 is coupled to system controller 108 via processor bus 110 and processor bus interface unit 112. Bus device 104 is coupled to system controller 108 via system bus 114 and bus interface unit 116. System memory 106 is coupled to processor 102 and bus device 104 via memory bus 118 and memory interface unit 120 of system controller 108. Illustrative system controller 108 employs switch 122 to route signals between processor 102, bus device 104 and memory 106.

In one embodiment, processor 102 communicates with processor bus interface unit 112 over processor bus 110 using the PENTIUM® Pro or P6 bus communication protocol. (A description of the PENTIUM® Pro bus communication protocol may be found in the "Pentium Pro Family Developer's Manual, Volume 1: Specifications," January 1996, available from Intel Corporation of Santa Clara, Calif.) One feature of the P6 protocol is the use of an 8-bit attribute field (denoted ATTR[7:0]#) during the second clock of a request phase operation.

In accordance with the invention, the attribute field may also be used during cache snoop operations to encode system controller state (e.g., to facilitate debug operations) and/or memory requester identification information. For example, in many current computer systems level-1 and/or level-2 caches 103 are coupled to processor bus 110. Thus, to maintain cache coherency, substantially all memory access requests are presented to processor bus 110 before being routed to memory interface unit 118. During these operations, the P6 bus attribute field is not used by processor 102 and can, instead, be driven by processor bus interface unit 112.

In one embodiment, the encoded information can indicate one or more characteristics of the receiving interface. In general, characteristics reflect a state of the receiving interface. One illustrative characteristic suitable for encoding in a tag is the current number of entries in an interface circuit's data (input/output or read/write) queue. Another characteristic suitable for encoding in a tag are ordering rule flags. One benefit to this embodiment is that internal system controller state information may be made available (on processor bus 110) during system design and testing that would otherwise not be available except through more invasive techniques. In a computer system utilizing two or more system controllers, encoding controller state information in accordance with the invention provides a means for each of the system controllers to know/determine the state of the other system controllers without the need of sideband signal paths. This is particularly advantageous when memory traffic is routed to processor bus 110 to facilitate cache snooping operations.

Figure 2:
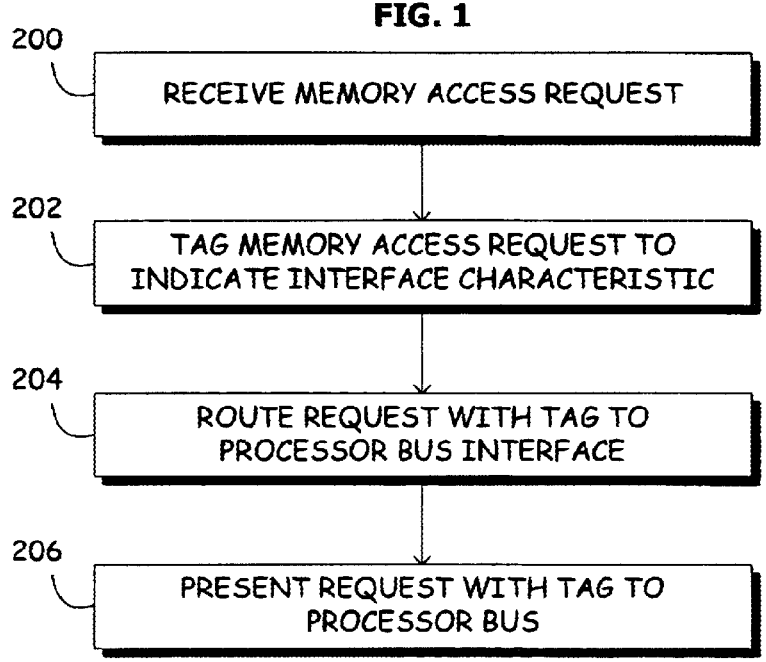
FIG. 2 shows a flow chart for a system controller operated in accordance with one embodiment of the invention.

Referring to FIG. 2, system controller 108 operated in accordance with this embodiment of the invention receives memory access requests at processor bus and system bus interface units 112 and 116 (block 200), tags the memory request with information indicating one or more characteristics of the receiving interface (block 202) and routes the tagged request to processor bus interface unit 112 (block 204). Processor bus interface unit 112 presents the memory access request to processor bus 110, encoding the characteristic indicated by the request's tag into the host buses attribute field (block 206). Once presented to processor bus 110, the encoded information may be captured and analyzed to aid in the design and/or testing of computer system 100.

In another embodiment, the encoded information can identify the device issuing the memory request. In general, information identifying the requesting device may indicate that the requesting device is, or is likely to be, a burst oriented device or a non-burst oriented device. Burst oriented devices are devices which typically make multiple consecutive accesses to a single page of system memory 108. Illustrative burst oriented devices include those devices which perform direct memory access operations and are often embodied in peripheral component interconnect devices coupled to system bus 114. In contrast, non-burst oriented devices typically make a first access to a first page of system memory 108 and a next a access to a different page of system memory 108. Illustrative non-burst oriented devices include processors and some network interface adapters. Identification information may indicate only that the requesting device is coupled to processor bus 110 or system bus 114. Alternatively, identification information may indicate a particular device (e.g., a specifically identified processor or a specifically identified bus device designed to perform direct memory access).

Figure 3:
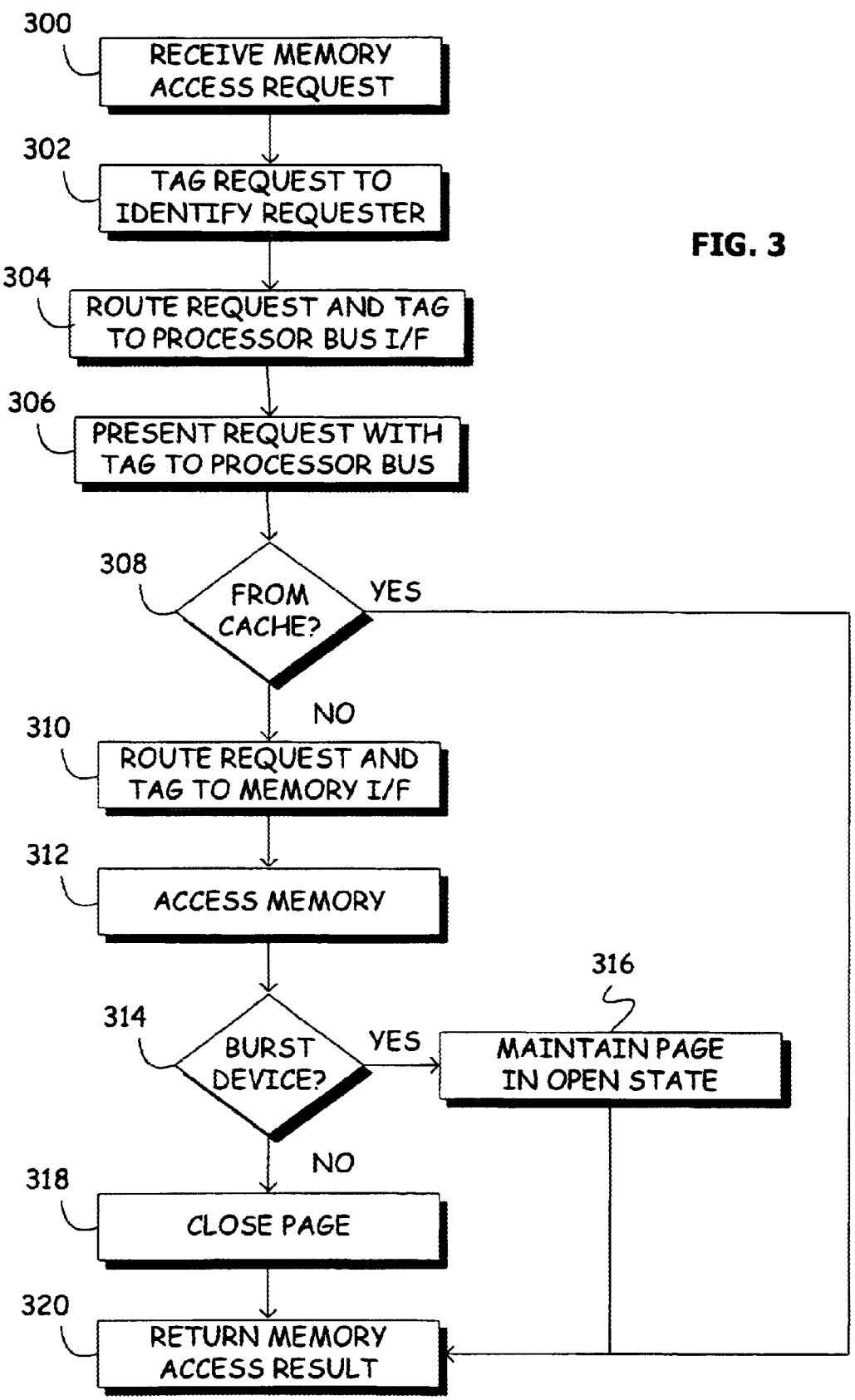
FIG. 3 shows a flow chart for a system controller operated in accordance with another embodiment of the invention.

Referring to FIG. 3, system controller 108 operated in accordance with this embodiment of the invention receives memory access requests at processor bus and system bus interface units 112 and 116 (block 300), tags the memory request to identify the requesting device and/or receiving interface (block 302) and routes the tagged request to processor bus interface unit 112 (block 304). Identification information may indicate that the requesting device is, or is likely to be, a burst oriented device or a non-burst oriented device. Burst oriented devices are devices which typically make multiple consecutive accesses to a single page of system memory 108. Illustrative burst oriented devices include those devices which perform direct memory access operations and are often embodied in peripheral component interconnect devices coupled to system bus 114. In contrast, non-burst oriented devices typically make a first access to a first page of system memory 108 and a next a access to a different page of system memory 108. Illustrative non-burst oriented devices include processors. Identification information may indicate only that the requesting device is coupled to processor bus 110 or system bus 114. Alternatively, identification information may indicate a particular device (e.g., a specifically identified processor or a specifically identified bus device). Processor bus interface unit 112 presents the memory access request to processor bus 110, encoding the requesting device's identity, indicated by the request's tag, into the host buses attribute field (block 306).

If the request can be satisfied from a cache (the "yes" prong of diamond 308), the relevant cache entry (or part thereof) is returned to the requesting device (block 320). If the request can not be satisfied from a cache coupled to processor bus 110 (the "no" prong of diamond 308), the memory access request and associated tag information is routed to memory interface unit 120 (block 310) which then accesses system memory 106 in accordance with procedures relevant to the particular type of memory used (block 312). If the identified requesting device is a burst oriented device (the "yes" prong of diamond 314), memory interface unit 120 maintains the just accessed page (i.e., column) in an open state (block 316). If the identified requesting device is not a burst oriented device (the "no" prong of diamond 314), memory interface unit 120 closes the just accessed page (block 318). Following, or in concert with, the acts of blocks 316 and 318, the results obtained from system memory 106 are returned to the requesting device (block 320). One benefit to this embodiment of the invention is that subsequent memory access operations by a burst oriented device may be improved by ensuring that the most recently accessed memory page is maintained in an open state (thereby avoiding the time required to open a page before reading from it). For example, if bus device 104 issues a memory request for N bytes of data (e.g., a memory prefetch operation), the target memory page may be held in an open state by interface 120 for the entire request. Another benefit of this embodiment of the invention is that subsequent memory access operations to the same bank of memory may be improved by ensuring that the page most recently accessed by a non-burst oriented device is closed (thereby avoiding the time needed to close one page and open another page when a subsequent memory request is made to the same memory bank).

As used herein, the act of "tagging" (block 202 in FIG. 2 and block 302 in FIG. 3) refers to any technique to associate relevant (debug or identification) information with a memory access request. Such information may be carried/encoded using one or more signal paths internal to system controller 108.

Figure 4:
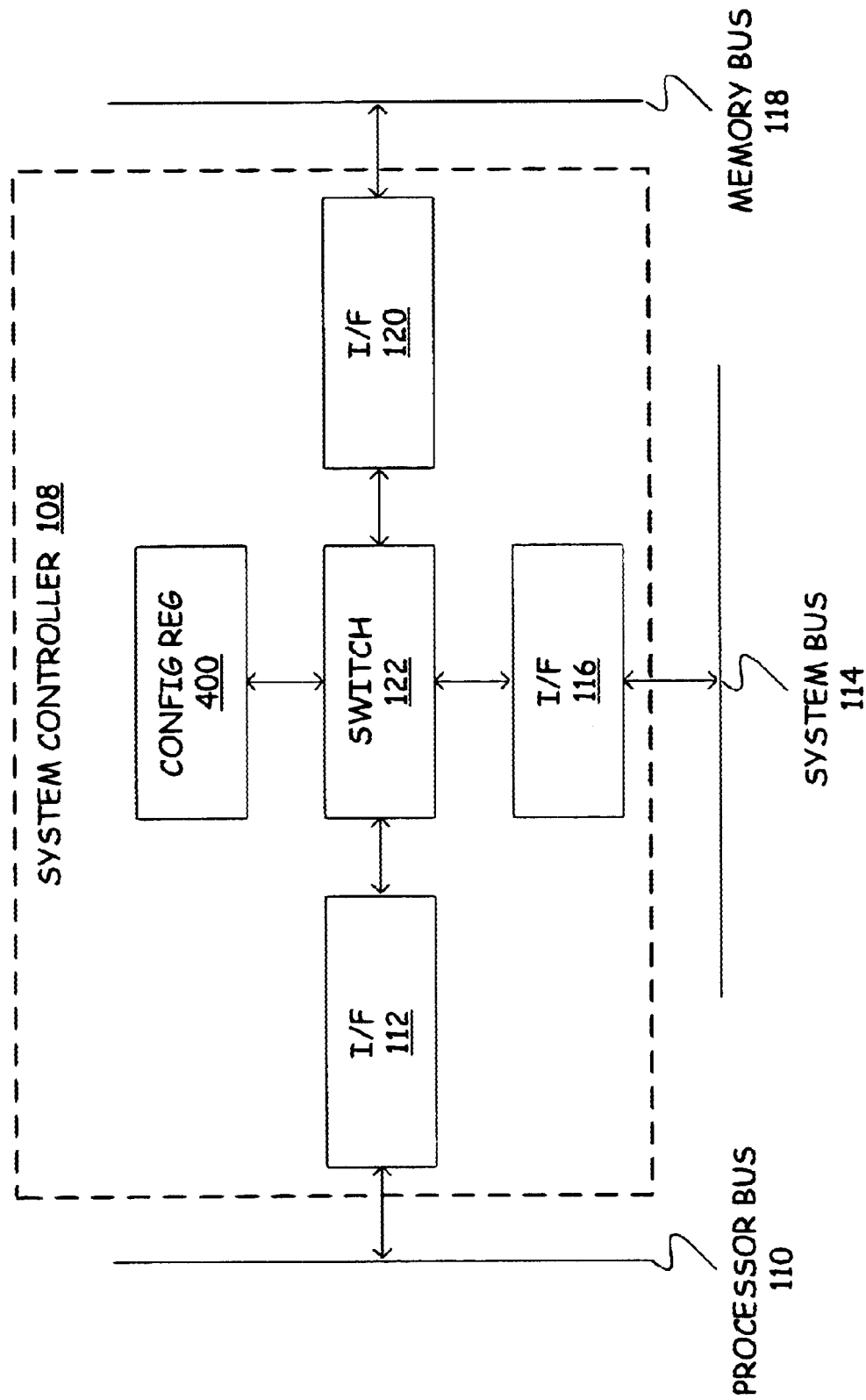
FIG. 4 shows an expanded block diagram of the system controller in accordance with FIG. 1.

Referring now to FIG. 4, an expanded block diagram of system controller 108 shows configuration register 400. During computer system power-on or reset operations, many computer system components may have their operational attributes or characteristics set through the conventional use of configuration registers. For example, peripheral component interconnect (e.g., bus device 104) and memory control devices (e.g., memory interface unit 120) are typically setup for run-time operations in this manner. Using this approach, configuration register 400 may be written to during setup operations (e.g., power on self test processing) so that processor bus interface 112 and/or system bus interface 116 tag received memory requests with debug or requester identification information. Configuration register 400 may have a first portion to indicate whether system controller 108 is to tag memory access requests at all, a second portion to indicate whether debug or requester identification information is to be encoded in a tag, a third portion to indicate what state information to encode during debug operations and a fourth portion to indicate which requesting devices are burst oriented devices and which are non-burst oriented devices. The size of each portion (i.e., number of bits) will depend upon the design constraints of the particular implementation such as the number of parameters that may be encoded in the tag.

While the invention has been disclosed with respect to a limited number of embodiments, numerous modifications and variations will be appreciated by those skilled in the art. For instance, one of ordinary skill will recognize that each of processor bus interface 112, system bus interface 116 and memory interface 120 units functionally incorporate master and slave circuits and that each of these circuits may include and control its own input and output (read and write) queue structures. In addition, the precise manner in which system controller state and/or requester identification information is encoded is a matter of design choice. (For those computer systems employing the PENTIUM® Pro processor bus communication protocol, the attribute field is limited to 8-bits. However, other processor bus communication protocols having similar non-used fields may also support methods and system controllers in accordance with the invention.) Further, system controller 108 may use a means other than switch 122 to facilitate interface to interface communications. Similarly, computer system 100 may include more than one system controller 108, more than one bus device 104 and may utilize any type of system memory 106 (e.g., dynamic and static random access memory) that the system designer chooses. In addition, a bus device (e.g., device 104) may comprise a system bus to secondary bus device such as the 82371EB PIIX4E bridge circuit available from Intel Corporation of Santa Clara, Calif. Further, system controller 108 may be embodied in any manner desired by the design engineer. For example, system controller 108 may be implemented as a programmable control device or state machine using application specific integrated circuit (ASIC) or field programmable gate array technology. Alternatively, system controller 108 may be implemented using conventional integrated circuits alone or in combination with discrete components.

It is intended, therefore, that the following claims cover all such modifications and variations that may fall within the true sprit and scope of the invention.

What is claimed is:

1. A method to process a memory access request in a system controller, comprising:

receiving the memory access request from a device;

tagging the memory access request to indicate a characteristic associated with the memory access request; and presenting the tagged memory access request to a processor bus external to the system controller;

wherein the act of tagging comprises associating information relating to a state of the system controller with the memory access request.

2. The method of claim 1, wherein the act of associating information relating to a state of the system controller comprises associating information indicative of a memory access request queue length.

3. The method of claim 1, wherein the act of associating information relating to a state of the system controller comprises associating information indicative of ordering flags.

4. The method of claim 1, wherein the act of associating information relating to a state of the system controller comprises associating information indicative of the number of entries in an interface queue.

5. The method of claim 1, wherein presenting the tagged memory access request comprises presenting the information relating to the state of the system controller along with the memory access request in a request cycle over the processor bus.

6. The method of claim 5, wherein presenting the tagged memory access request comprises presenting the tagged memory access request in a cache snoop operation on the processor bus.

7. A method to process a memory access request in a system controller, comprising:

receiving the memory access request from a device;

tagging the memory access request to indicate a characteristic associated with the memory access request; and presenting the tagged memory access request to a processor bus external to the system controller;

wherein the act of tagging comprises associating information identifying a characteristic of the device with the memory access request;

wherein the act of associating information identifying a characteristic of the device comprises associating information identifying the device as a burst oriented device or a non-burst oriented device.

8. The method of claim 7, wherein the act of presenting comprises placing the tagged memory access request onto a PENTIUM Pro processor bus.

9. The method of claim 8, wherein the tag is encoded in an attribute field.

10. The method of claim 7, further comprising receiving the tagged memory access request on the processor bus during system testing.

11. The method of claim 7, wherein presenting the tagged memory access request comprises presenting the tagged memory access request to a processor on the processor bus.

12. A method to process a memory access request in a system controller, comprising:

receiving the memory access request from a device;

tagging the memory access request to indicate a characteristic associated with the memory access request; and presenting the tagged memory access request in a cache snoop operation over a bus external to the system controller.

13. The method of claim 12, further comprising routing the tagged memory access request to a memory control unit if the tagged memory access request cannot be satisfied by a cache coupled to the bus.

14. The method of claim 13, further comprising accessing a page of memory in accordance with the tagged memory access request.

15. The method of claim 14, wherein the act of accessing further comprises leaving the page of memory in an open state if the characteristic of the device indicates a burst oriented device.

16. The method of claim 14, wherein the act of accessing further comprises closing the page of memory if the characteristic of the device indicates a non-burst oriented device.

17. A method to process a memory access request in a system controller, comprising:

receiving the memory access request from a device;

tagging the memory access request to indicate a characteristic associated with the memory access request;

presenting the tagged memory access request to a processor bus external to the system controller, wherein the act of tagging comprises associating information identifying a characteristic of the device with the memory access request; and accessing a page of memory in accordance with the tagged memory access request;

wherein the act of accessing further comprises leaving the page of memory in an open state if the characteristic of the device indicates a burst oriented device.

18. A method to process a memory access request in a system controller, comprising:

receiving the memory access request from a device;

tagging the memory access request to indicate a characteristic associated with the memory access request;

presenting the tagged memory access request to a processor bus external to the system controller, wherein the act of tagging comprises associating information identifying a characteristic of the device wit the memory access request; and accessing a page of memory in accordance with the tagged memory access request;

wherein the act of accessing further comprises closing the page of memory if the characteristic of the device indicates a non-burst oriented device.

19. A system controller capable of communicating on an external bus, comprising:
- a first interface to receive a memory access request, the memory access request to request access of a memory external to the system controller;
- a first unit adapted to generate information indicating a state of the system controller in response to the memory access request; and
- a second unit adapted to present the information on the external bus;
- wherein the information comprises information indicative of ordering flags.

20. The system controller of claim 19, wherein the first interface is adapted to receive the memory access request from a system bus.

21. The system controller of claim 20, further comprising a second interface adapted to communicate on the external bus, the second unit being part of the second interface.

22. The system controller of claim 19, wherein the information further comprises information indicative of a memory access request queue length.

23. The system controller of claim 19, wherein the information further comprises information indicative of a number of entries in a queue in the first interface.

24. The system controller of claim 19, wherein the second unit is adapted to present the information in an attribute field of the external bus.

25. The system controller of claim 19, wherein the second unit comprises a processor bus interface unit adapted to communicate with a processor bus, the external bus comprising the processor bus.

26. The system controller of claim 19, wherein the first unit is adapted to further generate additional information identifying a requestor that generated the memory access request,
- the second unit adapted to present the additional information on the external bus.

27. A system controller to process a memory access request from a device, comprising:
- a unit adapted to associate information identifying the device in response to the memory access request; and
- an interface adapted to communicate the memory access request and the information to a bus external to the system controller;
- wherein the information comprises information identifying the device as a burst-oriented device or a non-burst oriented device.

28. The system controller of claim 27, further comprising a memory control unit, the memory control unit adapted to access a page of memory in response to the memory access request,
- the memory control unit adapted to leave the accessed page in an open state if the device is burst-oriented and to close the accessed page if the device is a non-burst oriented device.

29. The system controller of claim 27, wherein the interface is adapted to communicate the memory access request and the information to a processor bus, the external bus comprising the processor bus.

30. The system controller of claim 29, wherein the interface is adapted to determine if the memory access request is satisfied by a cache coupled to the processor bus.

31. A system controller, comprising:
- an interface to receive a memory access request; and
- a first unit adapted to tag the memory access request with information to indicate a state of the system controller; and
- a second unit adapted to present the tagged memory access request to a bus external to the system controller.

32. A system controller capable of communicating on an external bus, comprising:
- a first interface to receive a memory access request, the memory access request to request access of a memory external to the system controller;
- a first unit adapted to generate information indicating a state of the system controller in response to the memory access request; and
- second unit adapted to present the information on the external bus;
- wherein the information comprises information identifying characteristics of components in the system controller.

33. A system controller to process a memory access request from a device, comprising:
- a unit adapted to associate information identifying the device in response to the memory access request; and
- an interface adapted to communicate the memory access request and the information to a bus external to the system controller;
- wherein the interface is adapted to communicate the memory access request and the information in a request cycle over the bus.

34. The system controller of claim 33, wherein the interface is adapted to communicate the memory access request and the information in a snoop operation over the bus.

* * * * *

UNITED STATES PATENT AND TRADEMARK OFFICE
CERTIFICATE OF CORRECTION

PATENT NO. : 6,678,803 B2
DATED : January 13, 2004
INVENTOR(S) : Paul A. LaBerge It is certified that error appears in the above-identified patent and that said Letters Patent is hereby corrected as shown below:

Column 6,
Line 61, "wit" should be -- with --.

Signed and Sealed this

Thirteenth Day of April, 2004

JON W. DUDAS
*Acting Director of the United States Patent and Trademark Office*